(12) United States Patent
Onishi et al.

(10) Patent No.: US 6,888,669 B2
(45) Date of Patent: May 3, 2005

(54) RAMAN AMPLIFIER

(75) Inventors: Masashi Onishi, Yokohama (JP);
Toshiaki Okuno, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 69 days.

(21) Appl. No.: 10/286,864

(22) Filed: Nov. 4, 2002

(65) Prior Publication Data

US 2003/0090781 A1 May 15, 2003

Related U.S. Application Data

(63) Continuation of application No. 09/901,451, filed on Jul. 10, 2001, now Pat. No. 6,483,633.

(30) Foreign Application Priority Data

Jul. 10, 2000 (JP) ........................................ 2000-208674

(51) Int. Cl.⁷ .................................................. H01S 3/00
(52) U.S. Cl. ........................................................ 359/334
(58) Field of Search .......................................... 359/334

(56) References Cited

U.S. PATENT DOCUMENTS

| | | | |
|---|---|---|---|
| 4,740,974 A | | 4/1988 | Byron ........................... 372/3 |
| 5,887,093 A | | 3/1999 | Hansen et al. ................ 385/27 |
| 6,101,024 A | | 8/2000 | Islam et al. .................. 359/334 |
| 6,301,419 B1 | * | 10/2001 | Tsukitani et al. ........... 385/123 |
| 6,307,984 B1 | | 10/2001 | Watanabe ..................... 385/24 |
| 6,453,103 B1 | * | 9/2002 | Okuno et al. ............... 385/123 |
| 6,501,892 B1 | * | 12/2002 | Okuno et al. ............... 385/127 |
| 6,603,913 B1 | * | 8/2003 | Okuno ........................ 385/127 |
| 2001/0000442 A1 | * | 4/2001 | Okuno et al. ............... 359/124 |
| 2002/0159132 A1 | * | 10/2002 | Grochocinski et al. ...... 359/334 |

FOREIGN PATENT DOCUMENTS

| | | | |
|---|---|---|---|
| EP | 0734105 A2 | 9/1996 | ............. H01S/3/06 |
| JP | 9-179152 | 7/1997 | ............. G02F/1/35 |
| JP | 11-174504 | 7/1999 | ............. G02B/6/26 |
| WO | WO 98/08138 | 2/1998 | ............. H01S/3/00 |

OTHER PUBLICATIONS

Ebrahimi et al. Statistics of Polarization Dependent Gain in Raman Fiber Amplifiers due to PMD. CLEO 2001. Jun. 6–11, 2001 pp. 143–144.*

"Less than 4.7 dB Noise Figure Broadband In–line EDFA with a Raman Amplified—1300 ps/nm DCF Pumped by Multi–channel WDM Laser Diodes", Y. Emori et al, OAA '98 Postdeadline Papers PD3–2 –3–5. 1998.

"Raman amplification for loss compensation in dispersion compensating fibre modules", P.B. Hansen et all, Electronics Letters May 28, 1998, vol. 34, No. 11, pp. 1136–1137.

* cited by examiner

*Primary Examiner*—Thomas G. Black
(74) *Attorney, Agent, or Firm*—McDermott Will & Emery LLP

(57) ABSTRACT

A Raman amplifier applicable to a wavelength division multiplexing optical transmission system is proposed. The Raman amplifier, which can make good use of a wavelength range, comprises an optical fiber for Raman amplification and a pump light introducing means. The zero-dispersion wavelength of the optical fiber and the wavelength of the pump light are nearly equal. The wavelength of pump light is preferably in the range where the absolute magnitude of the chromatic dispersion of the optical fiber is less than 0.3 $ps \cdot nm^{-1} \cdot km^{-1}$. A range near a zero-dispersion wavelength cannot be utilized as a signal range because waveform deterioration of signal light occurs due to four wave mixing. This range can be utilized effectively as a wavelength range of exciting light for Raman amplification.

5 Claims, 4 Drawing Sheets

RAMAN AMPLIFIER

This application is a continuation of application Ser. No. 09/901,451 filed on Jul. 10, 2001 now U.S. Pat. No. 6,483,633.

BACKGROUND OF THE INVENTION

1. Field of the Invention

The present invention relates to a Raman amplifier that is used in an optical communication system and that amplifies signal light in an optical fiber.

2. Related Background Arts

When light is incident on an optical fiber, the light is scattered by the vibration of glass structure of the optical fiber, thereby yielding scattering components on the longer wavelength side and the shorter wavelength side relative to the wavelength of the incident light. The scattering component on the longer wavelength side is called a Stokes line, and the scattering component on the shorter wavelength side is called an anti-Stokes line. The power of the Stokes line is stronger than that of the anti-Stokes line. If signal light having the same wavelength as the Stokes line is incident on an optical fiber at the same time as Stokes line occurs, stimulated Raman scattering is generated. The signal light is thereby Raman-amplified while propagating through the optical fiber. That is, the light performs as pump light for Raman amplification. This phenomenon is used for obtaining a Raman amplifier of discrete type or distributed-constant type. A rare-earth-doped optical fiber amplifier is suitable for amplifying light having a wavelength that corresponds to the energy level, whereas a Raman amplifier is characterized in that it can Amplify signal light having any wavelength by selecting a suitable wavelength of pump light for Raman amplification.

In the case of an optical fiber made of silica glass as a main component, the transmission loss becomes the smallest around the 1.55 μm wavelength. Also, the strongest stimulated emission occurs at the wavelength that is 14 THz (about 100 nm) away on the longer wavelength side relative to the pump light.

On the other hand, to avoid the waveform degradation of signal light pulses due to four-wave mixing which is one kind of nonlinear optical phenomenon, the wavelength of signal light and the zero dispersion wavelength of an optical fiber must not overlap each other. Moreover, to allow signal light to be received at an acceptable S/N ratio at the receiving end, and also to avoid the waveform degradation of signal light due to four-wave mixing or cross-phase modulation which is one kind of nonlinear optical phenomenon, the wavelength of signal light and the wavelength of pump light for Raman amplification must not overlap each other.

Under such restrictions an optical communication system proposed at present that uses a Raman amplifier employs the 1.55 μm band as the spectrum band for signal light, using an optical fiber having a finite chromatic dispersion of a few $ps \cdot nm^{-1} \cdot km^{-1}$ at the 1.55 μm wavelength (i.e. non zero dispersion shifted optical fiber). It also employs pump light for Raman amplification near the 1.45 μm wavelength. The zero dispersion wavelength of the non zero dispersion shifted optical fiber is near the 1.50 μm wavelength.

SUMMARY OF THE INVENTION

An object of the present invention is to provide a Raman amplifier where the spectrum band can be used efficiently and that is applicable to a Wavelength Division Multiplexing (WDM) optical communication system.

In order to achieve this and other objects, a Raman amplifier according to the present invention comprises an optical fiber allowing signal light to be amplified during propagation therethrough and a pump light supplying means for supplying pump light to the optical fiber. The zero dispersion wavelength of the optical fiber is nearly the same as the wavelength of the pump light. Preferably, the wavelength of the pump light is in the wavelength range where the absolute magnitude of the chromatic dispersion of the optical fiber is equal to or less than 0.3 $ps \cdot nm^{-1} \cdot km^{-1}$.

The pump light may include a plurality of wavelength components. The optical fiber may have a plurality of zero dispersion wavelengths and may be supplied with pump light having wavelengths that correspond to their respective zero dispersion wavelengths. Also optical fiber may have the absolute magnitude of dispersion slope of 0.01 $ps \cdot nm^{-2} \cdot km^{-1}$ or more but not exceeding 0.1 $ps \cdot nm^{-2} \cdot km^{-1}$ at the wavelength of the pump light.

The Raman amplifier may be wound in a coil form and may be stored within a station. In this case, preferably the optical fiber has an effective area equal to or less than 20 μm², transmission loss equal to or less than 1 dB/km at the wavelength of the signal light, polarization mode dispersion equal to or less than 0.2 $ps/km^{1/2}$ at the wavelength of the signal light, and a length equal to or less than 5 km.

The Raman amplifier may be installed as an optical transmission line between stations. In this case, preferably the optical fiber has an effective area equal to or more than 45 μm², transmission loss of 0.3 dB/km or less at the wavelength of the signal light, polarization mode dispersion equal to or less than 0.2 $ps \cdot km^{-1/2}$ at the wavelength of the signal light, and a length equal to or more than 10 km.

The above and further objects and novel features of the invention will be more fully clarified from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENTS

Figure 1:
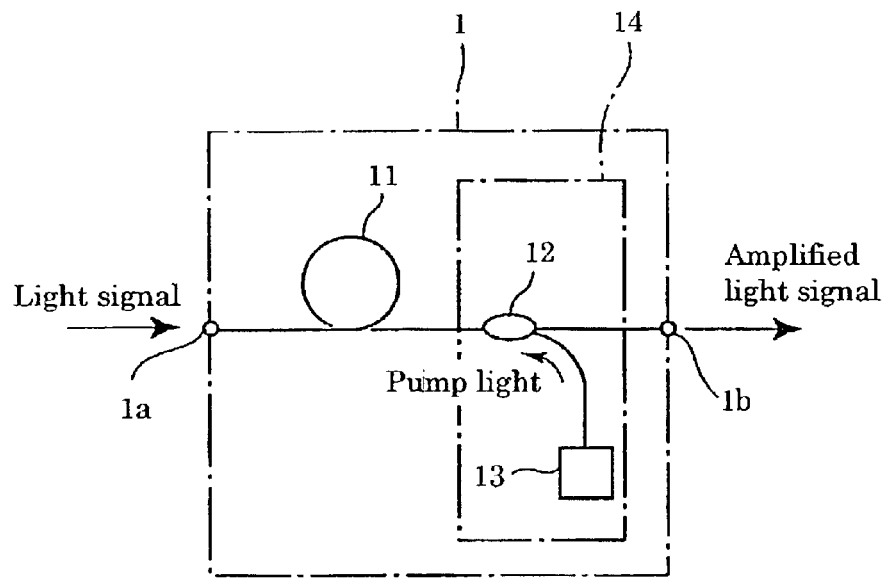
FIG. 1 is a schematic diagram of a Raman amplifier 1 according to an embodiment of the present invention.

In the following, preferred embodiments of the present invention will be explained in detail with reference to the accompanying drawings. To facilitate the comprehension of the explanation, the same reference numerals denote the same parts, where possible, throughout the drawings, and a repeated explanation will be omitted. The dimensions in the drawings are partly exaggerated and do not always correspond to actual ratios of dimensions.

An embodiment of the present invention will be explained mainly with respect to the composition of a Raman amplifier. FIG. 1 is a schematic diagram of a Raman amplifier 1. The Raman amplifier 1 is equipped with a pump light supplying means 14 and an optical fiber 11 for Raman amplification that is coiled in a module. The pump light supplying means 14 consists of a multiplexer/demultiplexer 12 and a pump light source 13. The pump light for Raman amplification that has been output from the pump light source 13 is supplied to the optical fiber 11 via the multiplexer/demultiplexer 12. The signal light incident on an input end 1a is Raman-amplified while propagating through the optical fiber 11. The Raman-amplified signal light is discharged from an output end 1b via the multiplexer/demultiplexer 12. That is, the Raman amplifier 1 is a Raman amplifier of discrete type that Raman-amplifies signal light propagating through the optical fiber 11 coiled in a module. A fiber optic coupler, an interference filter, or a planar waveguide can be used as the multiplexer/demultiplexer 12.

Figure 2:
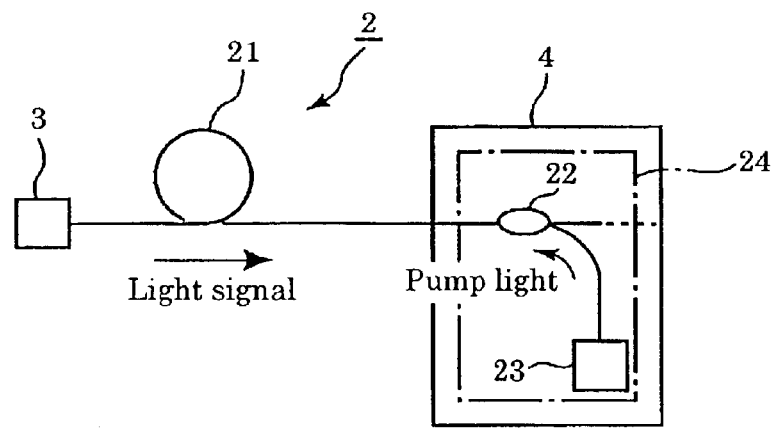
FIG. 2 is a schematic diagram of a Raman amplifier 2 according to an embodiment of the present invention.

FIG. 2 is a schematic diagram of a Raman amplifier 2. The Raman amplifier 2 is made of an optical fiber 21 for transmitting signal light that is installed at a repeater section between a repeater station (or a transmitting station) 3 and a repeater station (or a receiving station) 4. A pump light supplying means 24 is provided within the station 4. The pump light supplying means 24 comprises a multiplexer/demultiplexer 22 and a pump light source 23 The pump light for Raman amplification that has been output from the pump light source 23 is supplied to the optical fiber 21 via the multiplexer/demultiplexer 22. While propagating through the optical fiber 21, the signal light transmitted from the station 3 suffers from transmission loss peculiar to the optical fiber 21, and the transmission loss is compensated by Raman-amplification in the optical fiber 21. Therefore, the signal light reaches the station 4 with sufficient power and is received by it or is transmitted to the downstream via the multiplexer/demultiplexer 22.

That is, the Raman amplifier 2 is a Raman amplifier of distributed constant type that Raman-amplifies signal light propagating through the optical fiber 21 installed as an optical transmission line at a repeater section between the stations 3 and 4. A fiber optic coupler, an interference filter, or a planar waveguide can be used as the multiplexer/demultiplexer 22.

Next, the relationship between the chromatic dispersion characteristics of the optical fibers 11 and 21, signal light wavelength, and pump light wavelength for Raman amplification in the Raman amplifiers 1 and 2 will be explained referring to FIGS. 3 to 8, respectively. The abscissa of FIGS. 3 to 8 represents wavelength and the ordinate shows dispersion. A curve represents the chromatic dispersion characteristics of the optical fibers 11 and 21, a double-pointed arrow shows signal light spectrum band, and an upward-pointed arrow shows pump light wavelength for Raman amplification.

Figure 3:
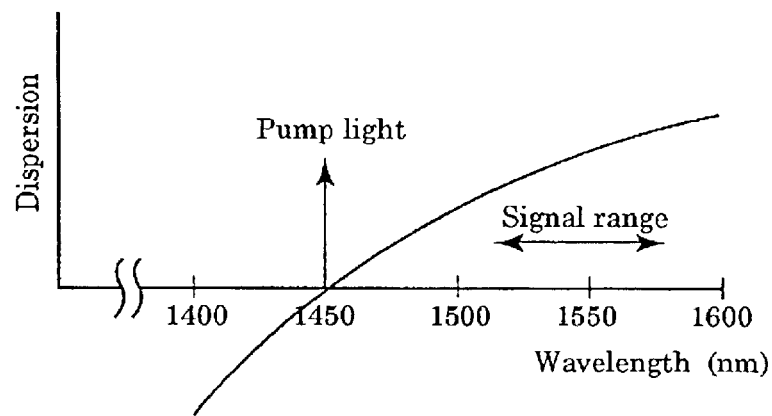
FIG. 3 shows the relationship between the chromatic dispersion characteristics of optical fibers 11 and 21, signal light spectrum band, and a pump light wavelength in a first preferable example according to an embodiment of the present invention.

In the case of FIG. 3, the pump light wavelength for Raman amplification and the wavelength where the chromatic dispersion of the optical fibers 11 and 21 becomes zero (hereinafter, zero dispersion wavelength) are nearly the same in the Raman amplifiers 1 and 2. Preferably the wavelength of the pump light for Raman amplification exists in a wavelength range where the absolute magnitude of the chromatic dispersion of the optical fibers 11 and 21 is equal to or less than 0.3 ps·nm$^{-1}$·km$^{-1}$. In the case of FIG. 3, the wavelength of the pump light for Raman amplification is 1450 nm. Also, the signal light spectrum band includes the 1550 nm wavelength and it is about 100 nm longer than the pump light wavelength for Raman amplification. The vicinity of the zero dispersion wavelength of the optical fibers 11 and 21 can be used as a pump light wavelength for Raman amplification but cannot be used as a signal light spectrum band because the waveform degradation of signal light occurs there due to four-wave mixing.

In an optical transmission system using a conventional Raman amplifier, it has been impossible to employ the 1.50 μm band in addition to the 1.55 μm band as the spectrum band of signal light because four-wave mixing easily causes the waveform degradation of signal light since the dispersion of the optical fiber is zero near 1.50 μm, even if Raman amplification can be done. On the other hand, in the case of a Raman amplifier according to the present invention, it is possible to use a spectrum band efficiently to increase the transmission capacity by employing the vicinities of 1.40 μm and 1.45 μm as the wavelength of pump light for Raman amplification while using the 1.50 μm band and the 1.55 μm band as the spectrum band of signal light, whereby allowing Raman amplification to be done without causing the waveform degradation of signal light due to four-wave mixing.

Figure 4:
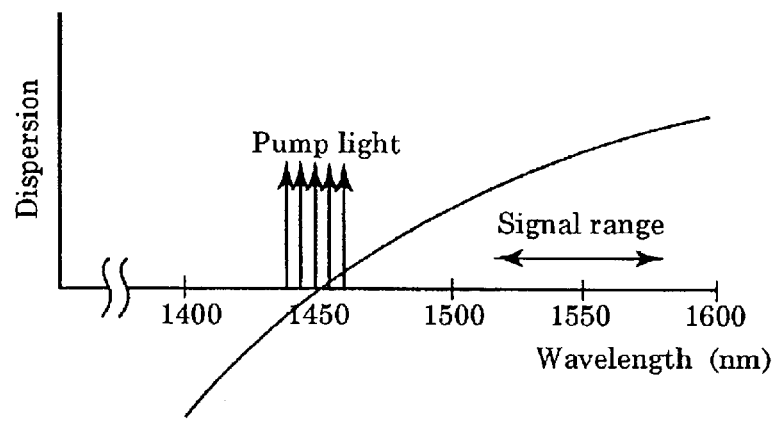
FIG. 4 shows the relationship between the chromatic dispersion characteristics of optical fibers 11 and 21, signal light spectrum band, and a pump light wavelength in a second preferable example according to an embodiment of the present invention.

Also, as in the case shown in FIG. 4, the pump light for Raman amplification preferably includes a plurality of wavelength components. One of the wavelength components of the pump light for Raman amplification nearly corresponds to the zero dispersion wavelength of the optical fibers 11 and 21. Preferably each wavelength component of the pump light for Raman amplification exists in the wavelength range where the absolute magnitude of the chromatic dispersion of the optical fibers 11 and 21 is equal to or less than 0.3 ps·nm$^{-1}$·km$^{-1}$. In the case of FIG. 4, each wavelength component of the pump light for Raman amplification is 1450 nm or around the vicinity thereof. The signal light spectrum band includes the 1550 nm wavelength and it is about 100 nm longer than the pump light wavelength for Raman amplification.

In this case also, the spectrum band can be used efficiently as in the case shown in FIG. 3. The signal light spectrum band can be broadened more than in the case shown in FIG. 3 by suitably setting the power of the respective wavelength components of the pump light for Raman amplification.

Furthermore, the gain spectrum can be made flat in a wide band. The supply of pump light for Raman amplification including such a plurality of wavelength components may be achieved using a plurality of semiconductor laser sources having different output wavelengths such that the light output from each semiconductor laser source is multiplexed into pump light for Raman amplification to be supplied to the optical fibers 11 and 21.

Figure 5:
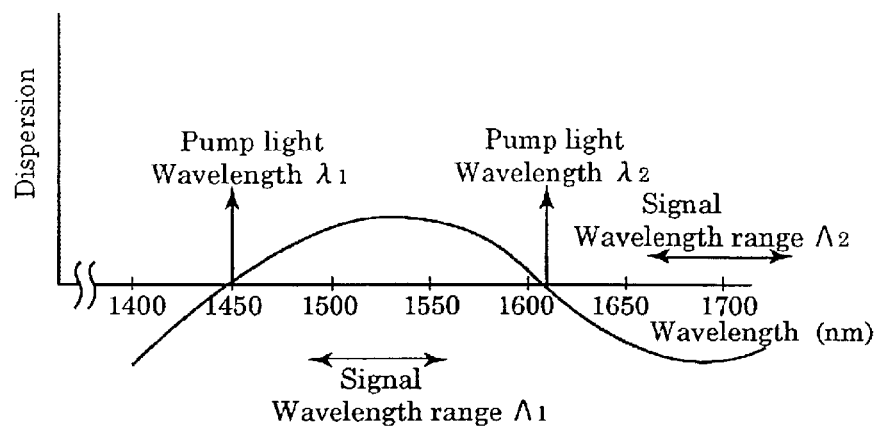
FIG. 5 shows the relationship between the chromatic dispersion characteristics of optical fibers 11 and 21, signal light spectrum band, and a pump light wavelength in a third preferable example according to an embodiment of the present invention.
Figure 6:
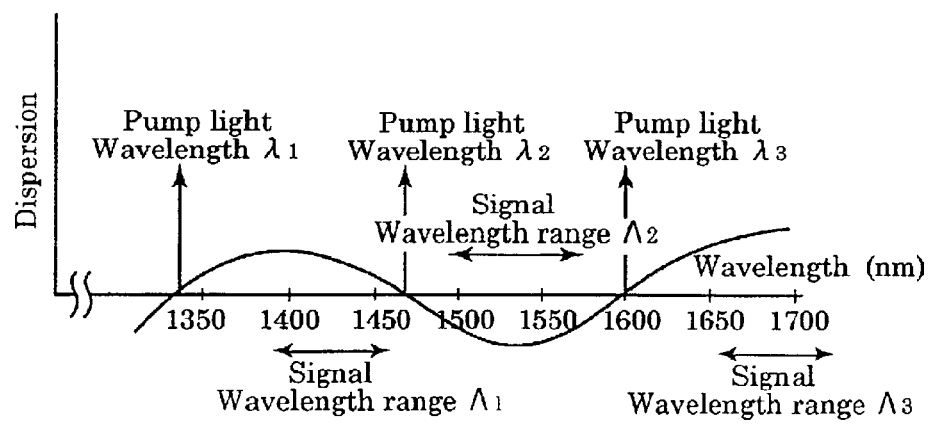
FIG. 6 shows the relationship between the chromatic dispersion characteristics of optical fibers 11 and 21, signal light spectrum band, and a pump light wavelength in a fourth preferable example according to an embodiment of the present invention.

It is also preferable that the optical fibers 11 and 21 have a plurality of zero dispersion wavelengths as in the cases shown in FIGS. 5 and 6, and that pump light for Raman amplification having the wavelengths nearly corresponding to the respective zero dispersion wavelengths be supplied to the optical fibers 11 and 21. In the example shown in FIG. 5, the optical fibers 11 and 21 have two zero dispersion wavelengths (1450 nm and 1610 nm), and pump light for Raman amplification having wavelengths $\lambda_1$ and $\lambda_2$ nearly corresponding to the respective zero dispersion wavelengths is supplied to the optical fibers 11 and 21. The signal light spectrum band $\Lambda_1$ includes the 1550 nm wavelength and it is about 100 nm longer than the pump light wavelength $\lambda_1$ for Raman amplification. The signal light spectrum band $\Lambda_2$ includes the 1710 nm wavelength and it is about 100 nm longer than the pump light wavelength $\lambda_2$ for Raman amplification.

In the example shown in FIG. 6, the optical fibers 11 and 21 have three zero dispersion wavelengths (1335 nm, 1465 nm and 1600 nm), and pump light for Raman amplification having wavelengths $\lambda_1$, $\lambda_2$ and $\lambda_3$ nearly corresponding to the respective zero dispersion wavelengths is supplied to the optical fibers 11 and 21. The signal light spectrum band $\Lambda_1$ includes the 1435 nm wavelength and it is about 100 nm longer than the pump light wavelength $\lambda_1$ for Raman amplification. The signal light spectrum band $\Lambda_2$ includes the 1565 nm wavelength and it is about 100 nm longer than the pump light wavelength $\lambda_2$ for Raman amplification. The signal light spectrum band $\Lambda_3$ includes the 1700 nm wavelength and it is about 100 nm longer than the pump light wavelength $\lambda_3$ for Raman amplification.

The spectrum band can be efficiently used in the cases shown in FIGS. 5 and 6 as well. In the cases shown in FIGS. 3 and 4, the dispersion compensation to be made at a terminal station is large because the chromatic dispersion of the optical fibers 11 and 21 in the signal light spectrum band is about 5 ps·nm$^{-1}$·km$^{-1}$ to 10 ps·nm$^{-1}$·km$^{-1}$. On the other hand, in the cases shown in FIGS. 5 and 6, the absolute magnitude of the chromatic dispersion of optical fibers 11 and 21 is small in a wide spectrum band, and the absolute magnitude of the chromatic dispersion of the optical fibers 11 and 21 in the signal light spectrum band may be about 0.5 ps·nm$^{-1}$·km$^{-1}$ to 2 ps·nm$^{-1}$·km$^{-1}$, the dispersion compensation to be made at a terminal station is comparatively small. This is also advantageous because the cost needed for dispersion compensation can be relatively reduced. Moreover, the examples shown in FIGS. 5 and 6 are effective for the performance of soliton transmission where the optical fibers 11 and 21 are required to have an extraordinary dispersion of about +0.5 ps·nm$^{-1}$·km$^{-1}$ in the signal light spectrum band.

Figure 7:
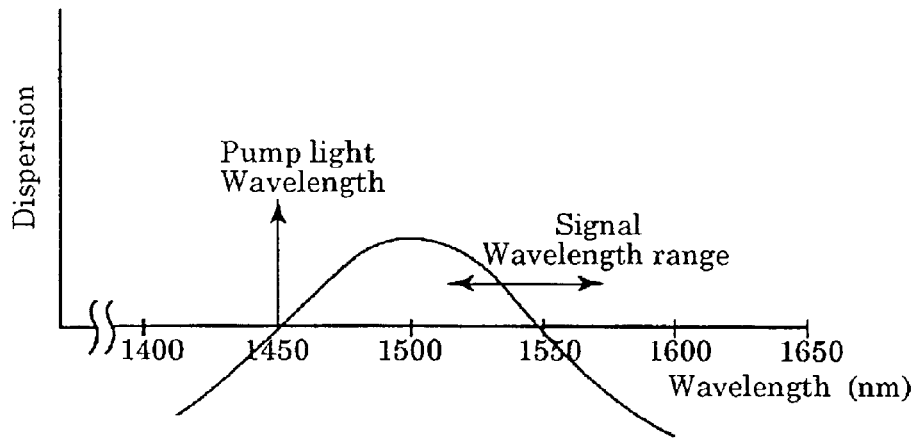
FIG. 7 shows the relationship between the chromatic dispersion characteristics of optical fibers 11 and 21, signal light spectrum band, and a pump light wavelength in a referential example according to an embodiment of the present invention.

When the optical fibers 11 and 21 have a plurality of zero dispersion wavelengths, the following point should be noted. That is, if pump light for Raman amplification having a wavelength that nearly corresponds to the zero dispersion wavelength of the shorter wavelength side is supplied to the optical fibers 11 and 21 when the wavelength interval between one zero dispersion wavelength and another zero dispersion wavelength is about 100 nm as shown in FIG. 7, the signal light spectrum band where optical amplification can be done by the pump light for Raman amplification includes other zero dispersion wavelength on the longer wavelength side. As a result, the waveform degradation of the signal light tends to occur due to four-wave mixing or cross-phase modulation. Therefore, the wavelength interval between one zero dispersion wavelength and another zero dispersion wavelength should not be about 100 nm.

Figure 8:
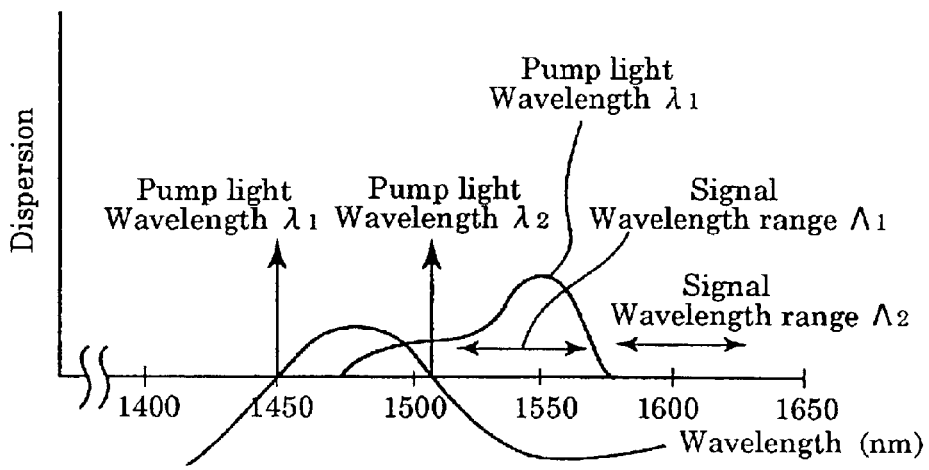
FIG. 8 shows the relationship between the chromatic dispersion characteristics of optical fibers 11 and 21, signal light spectrum band, and a pump light wavelength in a fifth preferable example according to an embodiment of the present invention.

On the other hand, when the wavelength interval between one zero dispersion wavelength and another zero dispersion wavelength is about 50 nm to 80 nm as shown in FIG. 8, the above-mentioned problem does not occur. In the example shown in FIG. 8, the optical fibers 11 and 21 have two zero dispersion wavelengths (1450 nm and 1510 nm), and pump light for Raman amplification having wavelengths $\lambda_1$ and $\lambda_2$ that nearly correspond to the respective zero dispersion wavelengths is supplied to the optical fibers 11 and 21. A signal light spectrum band $\Lambda_1$ includes the 1550 nm wavelength and it is about 100 nm longer than the pump light wavelength $\lambda_1$ for Raman amplification. A signal light spectrum band $\Lambda_2$ includes the 1610 nm wavelength and it is about 100 nm longer than the pump light wavelength $\lambda_2$ for Raman amplification. Neither of the signal light spectrum bands $\Lambda_1$ and $\Lambda_2$ include the zero dispersion wavelength of the optical fibers 11 and 21. Therefore, the waveform degradation of signal light due to four-wave mixing or cross-phase modulation is suppressed.

Moreover, the example shown in FIG. 8 is advantageous in the following respect. That is, the pump light for Raman amplification having the wavelength $\lambda_2$ exists in the band where Raman scattering is caused by the pump light for Raman amplification having the wavelength $\lambda_1$, and thereby the pump light for Raman amplification having the wavelength $\lambda_2$ is Raman-amplified. As a result, increased gain of the optical amplification is obtained in the signal light spectrum band $\Lambda_2$.

Next, a preferable constitution of the optical fibers 11 and 21 in the Raman amplifiers 1 and 2 will be explained. The refractive index profile of the optical fibers 11 and 21 is optional, but their preferable properties are as follows.

The optical fiber 11 used for the Raman amplifier 1 of discrete type, which is coiled into a module and stored within a station, preferably has an effective area equal to or less than 20 $\mu m^2$, transmission loss of 1 dB/km or less at a signal light wavelength, polarization mode dispersion equal to or less than 0.2 ps·km$^{-1/2}$ at a signal light wavelength, and a length equal to or less than 5 km.

The optical fiber 11 is suitable for storage in a coil form because the length is equal to or less than 5 km. Since the optical fiber 11 can enhance the power density of pump light for Raman amplification because the effective area is equal to or less than 20 $\mu m^2$, gain of optical amplification can be sufficiently obtained even if the length is equal to or less than 5 km. Since the polarization mode dispersion of the optical fiber 11 at a signal light wavelength is equal to or less than 0.2 ps·km$^{-1/2}$, the transmission loss characteristics of signal light are excellent even if the bit rate is 10 Gb/s or more.

On the other hand, the optical fiber 21 used for the Raman amplifier 2 of distributed type, which is installed as a transmission line between stations, preferably has an effective area equal to or more than 45 $\mu m^2$, transmission loss of 0.3 dB/km or less at a signal light wavelength, polarization mode dispersion at a signal light wavelength equal to or less than 0.2 ps·km$^{-1/2}$, and a length equal to or more than 10 km.

The optical fiber 21 can obtain sufficient gain of optical amplification as a whole although the gain of optical amplification at a unit length is small because it has a long length sufficient for installation at a repeater section and because it has an effective area equal to or more than 45 $\mu m^2$. In the optical fiber 21, the occurrence of nonlinear optical phenomenon such as self-phase modulation is suppressed because the effective area is equal to or more than 45 $\mu m^2$. The overall transmission loss of the optical fiber 21 is small notwithstanding that it has a long length sufficient for installation at a repeater section because the transmission loss at a signal light wavelength is equal to or less than of 0.3 dB/km. The optical fiber 21 has excellent transmission loss characteristics of signal light even if the bit rate is 10 Gb/s or more because the polarization mode dispersion at a signal light wavelength is equal to or less than 0.2 ps·km$^{-1/2}$.

Also, the optical fibers 11 and 21 preferably have the absolute magnitude of dispersion slope equal to or more than 0.01 ps·nm$^{-2}$·km$^{-1}$ but not more than 0.1 ps·nm$^{-2}$·km$^{-1}$ at the wavelength of pump light for Raman amplification. Then, the absolute magnitude of the chromatic dispersion of the optical fibers 11 and 21 becomes equal to or more than 0.5 ps·nm$^{-1}$·km$^{-1}$ but not more than 10 ps·nm$^{-1}$·km$^{-1}$ in a signal light spectrum band including the wavelength and it is about 100 nm longer than a pump light wavelength for Raman amplification. Since the absolute magnitude of the chromatic dispersion of the optical fibers 11 and 21 is within such range at the signal light spectrum band, the waveform degradation of signal light due to four-wave mixing is suppressed.

What is claimed is:

1. A Raman amplifier comprising:

a pump light source arranged to generate pump light; and an optical fiber, arranged to:

propagate signal light, receive the pump light, and amplify the signal light, wherein; said optical fiber has an effective area equal to or less than 20 $\mu m^2$;

transmission loss equal to or less than 1 dB/km at the at least one wavelength of the signal light; and polarization mode dispersion equal to or less than 0.2 ps/km1/2 at the at least one wavelength of the signal light.

2. A Raman amplifier according to claim 1, wherein a length of the optical fiber is equal to or less than 5 km.

3. A Raman amplifier according to claim 1, wherein the optical fiber is wound in a coil formed stored within a station.

4. A Raman amplifier according to claim 1, wherein the pump light includes a plurality of wavelength components.

5. A Raman amplifier according to claim 1, wherein the optical fiber has an absolute magnitude of dispersion slope at the at least one wavelength of the pump light equal to or more than 0.01 ps·nm$^{-2}$·km$^{-1}$ but not more than 0.1 ps·nm$^{-2}$·km$^{-1}$.

* * * * *